(No Model.)
G. ALLEN.
SUCKER ROD.
No. 348,944.                     Patented Sept. 14, 1886.
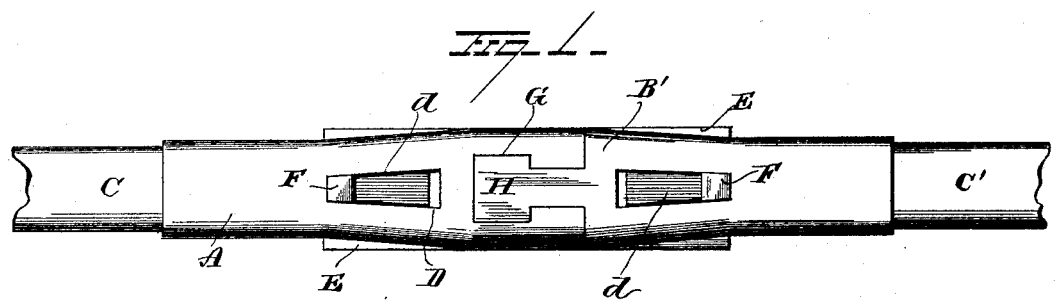
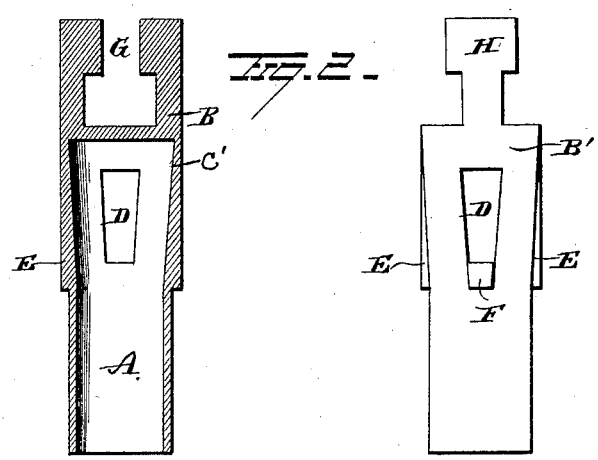
WITNESSES
R. A. Nottingham
N. E. Jones
INVENTOR
George Allen.
By Leggett and Leggett
Attorney

United States Patent Office.

GEORGE ALLEN, OF FRANKLIN, PENNSYLVANIA, ASSIGNOR OF ONE-HALF TO JOSEPH C. SIBLEY, OF SAME PLACE.

SUCKER-ROD.

SPECIFICATION forming part of Letters Patent No. 348,944, dated September 14, 1886.

Application filed April 22, 1886. Serial No. 199,760. (No model.)

*To all whom it may concern:*

Be it known that I, GEORGE ALLEN, of Franklin, in the county of Venango and State of Pennsylvania, have invented certain new and useful Improvements in Oil-Pumps; and I do hereby declare the following to be a full, clear, and exact description of the invention, such as will enable others skilled in the art to which it appertains to make and use the same.

My invention relates to an improvement in sucker-rods.

Hitherto the sections of the piston-rods of oil-pumps have generally been screwed or bolted together, so that an irretrievable loss of time has been caused in coupling and uncoupling the sections when the well was deep, and many couplings were made in the piston-rod.

The object of my present invention is to provide couplings which may be securely attached to the ends of the sections of the piston-rod, to enable the said sections to be quickly and firmly attached to each other.

A further object is to provide means for guiding the piston-rod centrally within the barrel or pipe of the pump.

With these ends in view my invention consists in certain features of construction and combinations of parts, as will be hereinafter fully described, and pointed out in the claims.

In the accompanying drawings, Figure 1 is a view of my improved coupling device holding the sections of a piston-rod in engaged adjustment. Fig. 2 is a view of the parts detached.

A represents the hollow cylindrical part of the female coupling-section B, preferably made of malleable iron, with the end of the piston-rod C embedded therein. The bore of the section B is made larger at its inner end than at its outer end. A slot, D, in the side of the coupling is adapted to admit a pin or wedge, d, which, when driven through the end of the rod C, spreads it laterally, holding it rigidly against the interior surface of the bulging part C' of the coupling B. The elongated lugs or ribs E are formed integral with and extend longitudinally along the surface of the coupling B, about midway between its ends. The shorter lugs, F, are formed at one end of the slot D. These lugs serve for two purposes—to prevent the rod C from vibrating within the pipe or barrel of the pump and allowing the couplings to unlock, and to form stops by which to hold the rod suspended while the parts are coupled or uncoupled.

The female coupling B is provided at one end with an open slot, G. This slot may be round, triangular, or any convenient shape, provided its inner part or head is broader than the neck leading to it. A T-shaped form is very desirable for this slot.

The male section B' terminates in a lug or button, H, which is adapted to slide laterally into and fit loosely in the slot G of the female section B. In other respects the male section B' is formed similar to the section B, and, like the latter, is formed to receive an end of the piston-rod C' and be rigidly secured thereto by wedging.

By the peculiar form of the ends of sections B B' it will be seen that while they may be joined or separated laterally they are securely locked longitudinally. Before the end B is lowered into the barrel or tubing of the well, by placing a clamp under the lugs E and F the piston-rod is held suspended until the button H of the male coupling B' is slid laterally into the opening G, out of which it is kept from sliding by the lugs E F, which prevent any swaying motion of the rod within the pipe. Since a lateral sliding is necessary to allow the parts to be detached, it is impossible for them to separate while in the pipe or barrel.

It is evident that slight changes might be resorted to in the form and arrangement of the several parts described without departing from the spirit and scope of my invention; hence I do not wish to limit myself strictly to the particular construction herein set forth; but, Having fully described my invention, what I claim as new, and desire to secure by Letters Patent, is—

1. The combination, with two coupling-sections adapted to be locked against longitudinal displacement by a lateral movement of one or both of the parts, the said coupling-sections having sockets for the rods, of the rods and wedges for locking the rods to the coupling-sections, substantially as set forth.

2. The combination, with the jointed piston-rod, of guiding-lugs or ribs secured to the piston-rod, for the purpose substantially as set forth.

3. The combination, with the jointed piston-rod, of a pair of coupling-sections provided with guiding lugs or ribs and means for rigidly securing the said couplings to the piston-rod, substantially as set forth.

4. In a sucker-rod, the combination, with a coupling-section provided with a taper bore and having slots in its sides and with lugs or projections for guiding the rod, of a piston-rod section adapted to enter the said bore, and a wedge or pin adapted to engage the piston-rod section through the slots, for the purpose substantially as set forth.

5. In a sucker-rod, the coupling-section provided with laterally-extending lugs and with slots in its sides, for the purpose substantially as set forth.

In testimony whereof I have signed this specification in the presence of two subscribing witnesses.

GEORGE ALLEN.

Witnesses:
E. H. LAMBERTON,
E. D. ALLEN.